(12) United States Patent　(10) Patent No.:　US 6,296,563 B1
Vincent　(45) Date of Patent:　Oct. 2, 2001

(54) DEVICE FOR THE DISTRIBUTION OF VENTILATION AIR IN THE PASSENGER COMPARTMENT OF A MOTOR VEHICLE

(75) Inventor: Philippe Vincent, Epernon (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/493,512

(22) Filed: Jan. 28, 2000

(30) Foreign Application Priority Data

Jan. 29, 1998 (FR) .................................................. 98 01024

(51) Int. Cl.⁷ ........................................................ B60S 1/54
(52) U.S. Cl. ............................................. 454/121; 454/156
(58) Field of Search ................................... 454/121, 143, 454/152, 156, 126, 148

(56) References Cited

U.S. PATENT DOCUMENTS 5,009,392 * 4/1991 Ostrand et al. ...................... 251/180
5,080,140 * 1/1992 Ostrand et al. ...................... 137/875
5,338,249 * 8/1994 Hildebrand et al. ................. 454/126

FOREIGN PATENT DOCUMENTS 36 08 524　9/1987　(DE) .
0 461 421　12/1991　(EP) .
0 551 754　7/1993　(EP) .
0 865 945　9/1998　(EP) .
2 562 845　10/1985　(FR) .

OTHER PUBLICATIONS

French Search Report dated Oct. 20, 1999.

* cited by examiner

Primary Examiner—Harold Joyce
Assistant Examiner—Derek S. Boles
(74) Attorney, Agent, or Firm—Morgan & Finnegan, LLP.

(57) ABSTRACT

The invention relates to a device for the distribution of ventilating air in the passenger compartment of a motor vehicle. This device has, downstream of a ventilating flap mounted in rotation about a transverse axis in a distribution compartment, a central ventilating duct and two lateral ventilating ducts which deliver air to lateral ventilating outlets. An additional passage connects the chamber (10) upstream of the ventilating flap (8) to the lateral ventilating outlets in the operating modes not involving ventilation, in order to deliver ventilating air to these lateral outlets in these operating modes so as to improve the comfort of the passengers. This passage may be formed by a vent, or by inlet cross sections larger than the area of the flap in front of the lateral ducts.

14 Claims, 8 Drawing Sheets

DEVICE FOR THE DISTRIBUTION OF VENTILATION AIR IN THE PASSENGER COMPARTMENT OF A MOTOR VEHICLE

BACKGROUND OF THE INVENTION

The invention relates to an assembly for the heating, ventilation and/or air conditioning of the passenger compartment of a motor vehicle.

It relates more particularly to a device for the distribution of ventilating air in the passenger compartment of a motor vehicle, having, downstream of a ventilating flap mounted in rotation about a transverse axis in a distribution compartment of a heating, ventilation and/or air conditioning assembly, a central ventilating duct and at least one lateral duct which are separated from the central duct by at least one partition perpendicular to the axis of rotation of the said ventilating flap and are intended to deliver air to at least one lateral ventilating outlet, the said ventilating flap being capable of assuming several angular positions as a function of the operating modes of the said assembly, in particular an open position in the operating modes of ventilating and ventilating/heating the feet, in which modes an airflow supplies the said ducts, and closed positions in the operating modes of heating the feet, deicing/heating the feet and deicing, in which modes the said ventilating flap closes off the inlets of the said ducts and the said ducts are supplied only with air leaks.

In the operating modes not involving ventilation, that is to say in the operating modes of heating the feet, deicing/heating the feet and deicing, the heated air delivered by the mixing or heating device is distributed between the foot ventilating outlets located in the bottom part of the vehicle and the deicing outlets arranged close to the windshield. In these operating modes, the lateral ventilating outlets supplied by the lateral ventilating ducts, and the central ventilating outlets supplied by the central ventilating duct, deliver only air leaks which pass through the gaps located between the edges of the ventilating flap and the walls of the inlets of the ducts.

For the comfort of the passengers, during these operating modes it would be expedient for the leaks flowing through the lateral ducts to vary as a function of the selected operating mode. The central outlets are located in the middle part of the dashboard of the vehicle, while the lateral ventilating outlets are arranged facing the front passengers.

BRIEF SUMMARY OF THE INVENTION

The object of the invention is to provide a distribution device as mentioned in the preamble which improves the comfort of the passengers.

The invention achieves its object by the fact that the proposed device further includes means for supplying the lateral ducts with an additional airflow which varies as a function of the selected operating mode.

According to a first embodiment of the invention, the said means consist of lateral vents permanently connecting the lateral ducts to the chamber located upstream of the said ventilating flap.

According to a second embodiment of the invention, the said ventilating flap has, in the same plane, a middle closing plate in the inlet of the central duct and lateral closing plates in the inlets of the lateral ducts, and the said lateral plates have a smaller area than the cross sections of the inlet of the lateral ducts in planes passing through the axis of rotation of the said ventilating flap.

According to a first variant of this second embodiment, the inlets of the lateral ducts are delimited transversely by cylindrical walls which are centered on the axis of rotation of the said ventilating flap and are at a distance from the transverse edges of the lateral closing plates.

According to a second embodiment variant, the distribution compartment has lateral bulges in front of the inlets of the lateral ducts.

According to another embodiment variant, the lateral closing plates have holes through them.

According to a third embodiment of the invention, each lateral duct is separated by a separating partition perpendicular to the axis of rotation of the ventilating flap into an inner lateral passage and an outer lateral passage, and the ventilating flap has, in the same plane, a middle closing plate in the inlet of the central duct and lateral closing plates in the inlets of the inner lateral passages, the said outer lateral passages being intended to deliver ventilating air to the lateral ventilating outlets.

Preferably, the ventilating flap further has means for closing off the inlets of outer lateral passages in the operating modes of ventilating and ventilating/heating the feet.

According to a first variant of the third embodiment, the ventilating flap has, in the inlets of the outer lateral passages, closing walls which are substantially perpendicular to the plane of the closing plates.

According to a second variant, the inlet of the outer lateral passages is formed by holes made in the separating partitions, and the ventilating flap has flanges which are capable of closing off the said holes.

According to a third variant, the ventilating flap has, in the inlets of the outer lateral passages, closing walls making an acute angle with the plane of the closing plates.

The ventilating flap may be a flap of the butterfly type whose axis of rotation is at the center of the inlet of the ducts. It may also be formed by one wing of a distribution flap of the butterfly type, the other wing of which controls the airflow for heating the feet.

BRIEF DESCRIPTION OF THE DRAWINGS

Other advantages and features of the invention will become apparent on reading the description of several embodiments which is given below by way of example and with reference to the attached drawings, in which:

FIGS. 1 to 4 relate to a first embodiment of the device for the distribution of ventilating air according to the invention:

FIGS. 5 to 15 relate to a second embodiment of the device of the invention according to several variants;

FIGS. 5 to 7 show a first variant according to the second embodiment;

FIGS. 8 to 11 show a second variant according to the second embodiment of the invention;

FIGS. 12 to 14 relate to a third variant according to the second embodiment of the invention;

FIGS. 16 to 32 relate to a third embodiment of the invention according to several variants;

FIGS. 16 to 20 refer to a first variant;

FIGS. 21 to 24 refer to a second variant according to the third embodiment;

FIGS. 25 to 28 relate to a third variant according to the third embodiment;

FIGS. 29 to 32 relate to a fourth variant of the device according to the third embodiment of the invention;

DETAILED DESCRIPTION OF THE INVENTION

In the various embodiments of the invention which are described in detail below and are shown in the drawings, reference 1 represents the upper part of a distribution compartment of an assembly for the heating, ventilation and/or air conditioning of the passenger compartment of a motor vehicle. All the embodiments have been described in the case of two lateral ducts, although it is quite clear that these embodiments may be extended to a larger number of channels. This compartment has lateral walls 2 and 3 which are joined by transverse walls 4 and 5. The transverse walls 4 and 5 have several openings for connecting the mixing device of the said assembly with ducts for delivering air to the passenger compartment of the vehicle, in particular the ventilating ducts intended to deliver an airflow to the lateral ventilating outlets 6 and the central ventilating outlets 7.

A ventilating flap 8 is mounted in rotation about a transverse axis 9 downstream of a chamber 10, in the inlet of the ventilating ducts. This ventilating flap 8 can assume several positions as a function of the operating modes of the assembly. These positions of the flap 8 are numbered 1 to 5 in the drawings.

The position numbered 1 corresponds to the deicing operating mode, in which all the air delivered by the mixing device is sent to the deicing duct.

The position numbered 2 corresponds to the combined operating mode of deicing/heating the feet, in which all the air delivered by the mixing device is distributed between the deicing duct and the duct for heating the feet.

The position numbered 3 corresponds to the operating mode of heating the feet. In this operating mode, only the duct for heating the feet is supplied with air.

The position numbered 4 corresponds to the mixed operating mode of ventilating/heating the feet, in which the air delivered by the mixing device is distributed between the ventilating ducts and the duct for heating the feet.

The position numbered 5 corresponds to the ventilation operating mode. In this operating mode, all the air delivered by the mixing device is directed to the heating ducts.

The ventilating flap 8 is actuated by a control element arranged on the dashboard of the vehicle. Normally, in positions 1 to 5 of the flap 8, no air is directed to the ventilating ducts. However, because of the pressure difference between upstream and downstream of the ventilating flap 8, air leaks occur through the gaps between the edges of the ventilating flap 8 and the walls of the chamber 10. These unavoidable leaks are represented by the reference RL in the graphs which represent the airflows in the lateral ventilating outlets 6 and the central ventilating outlets 7, as a function of the position of the ventilating flap 8.

These leakage flows RL are, however, insufficient in the lateral ventilating outlets 6 to provide comfort for the front passengers. According to the invention, the ventilating flap 8 or the ventilating ducts are equipped with means for controlling the airflow delivered by the lateral outlets 6 corresponding respectively to the positions numbered 1 to 5 of the ventilating flap 8.

For this purpose, the central ventilating outlets 7 communicate with a central ventilating duct 11, and the lateral ventilating outlets 6 communicate with lateral ventilating ducts 12 which are each separated from the central duct 11 by a partition 13 arranged perpendicular to the axis of rotation 9 of the ventilating flap 8. These ducts 11 and 12 open into the chamber 10 immediately downstream of the ventilating flap 8 and are delimited externally by the transverse walls 4 and 5 of the distribution compartment and its lateral walls 2 and 3.

Figures 1, 2:
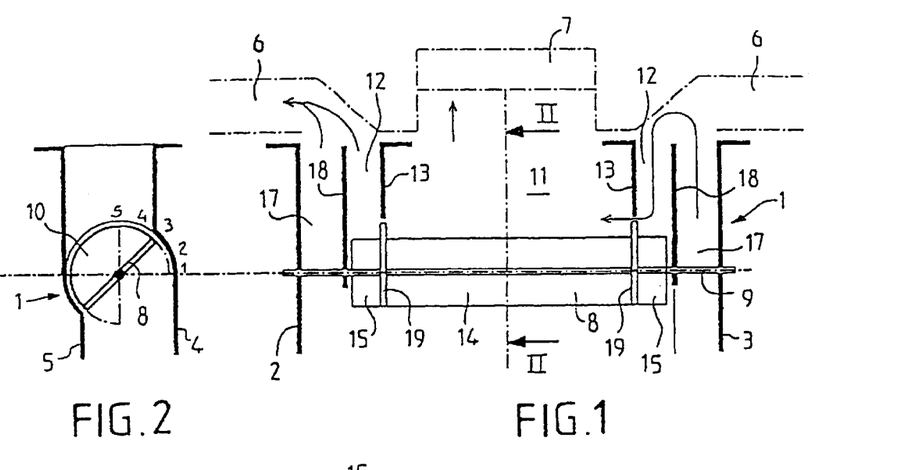
FIG. 1 is a section on an axial plane.
FIG. 2 is a cross section on the line II—II in FIG. 1.
Figure 3:
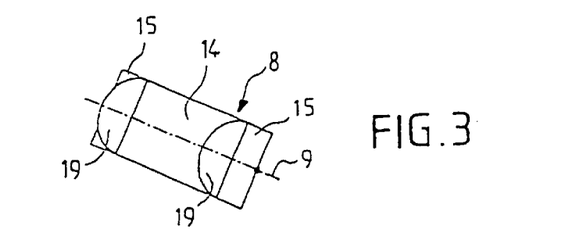
FIG. 3 is a perspective view of the flap of the device in FIGS. 1 and 2.
Figure 4:
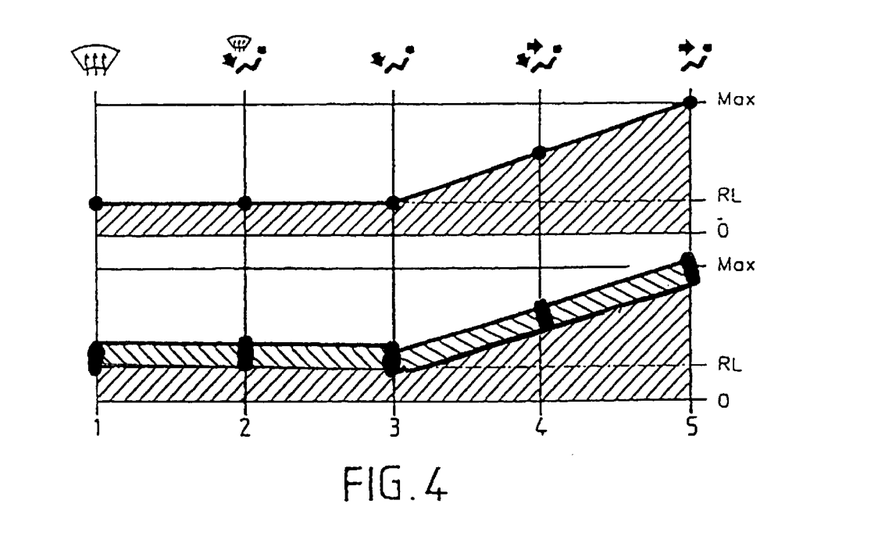
FIG. 4 shows the variation of the airflows in the central duct (top) and in a lateral duct (bottom), as a function of the operating modes, for the device in FIGS. 1 and 2.

The closing flap 8 has, in the same plane passing through the axis of rotation 9, a middle closing plate 14 intended to control the airflow in the central duct 11 and two lateral closing plates 15 intended to control the airflow in the lateral ducts 12, in the operating modes of ventilating and ventilating/heating the feet. The lateral closing plates 15 may form an extension of the middle plate 14 or be separated from the latter by a gap 16 (see FIG. 4) in which the upstream end of the wall 13 extends.

According to a first embodiment of the invention, which is shown in FIGS. 1 to 4, two lateral vents 17 are provided on the outer side of the lateral ducts 12, and are separated from the latter by partitions 18, which are perpendicular to the axis of rotation 9 and arranged between the partitions 13 and the lateral walls 2 and 3 of the distribution compartment. The partitions 18 extend transversely on either side of the ventilating flap 8. The vents 17 place the chamber 10 in permanent communication with the lateral outlets 6. Hence, in the operating modes not involving ventilation, which correspond to the positions numbered 1 to 5, the lateral ventilating outlets 6 receive an airflow larger than the airflow referenced RL in FIG. 4, while the central ventilating outlets 7 receive a leakage flow RL. Half-disks 19 are interposed between the middle plate 14 and the lateral plates 15 on one face of the ventilating flap 8, which is of the butterfly type. These half-disks 19 interact with the edges of the partitions 13 to make a seal between the central duct 11 and the lateral ducts 12.

According to a second embodiment of the invention, which is shown in FIGS. 5 to 14, the lateral closing plates 15 of the ventilating flap 8 have an area smaller than the area of the inlet cross sections of the lateral ducts 12 in planes passing through the axis of rotation 9 of the ventilating flap 9 [sic], so as to form a passage between the chamber 10 and the lateral ducts 12 in the operating modes numbered 1 to 5.

Figure 5:
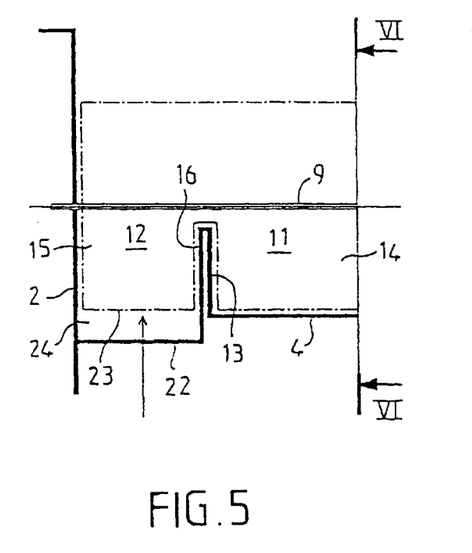
FIG. 5 is an axial section of this first variant.
Figure 6:
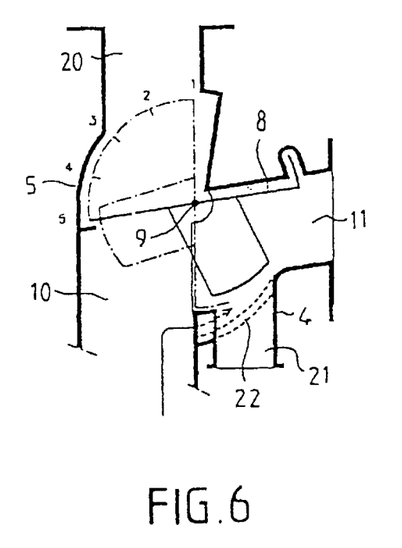
FIG. 6 is a cross section.
Figure 7:
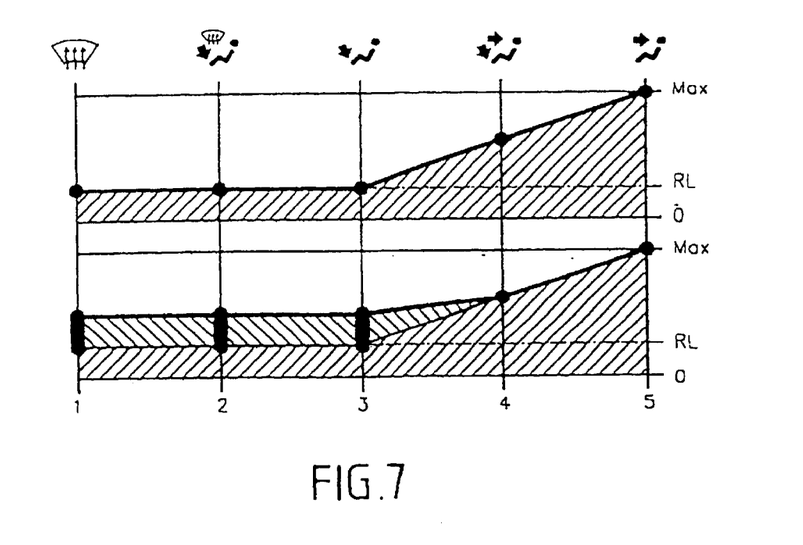
FIG. 7 shows the variant [sic] of the airflows in the ventilating ducts.
Figures 8, 9, 10:
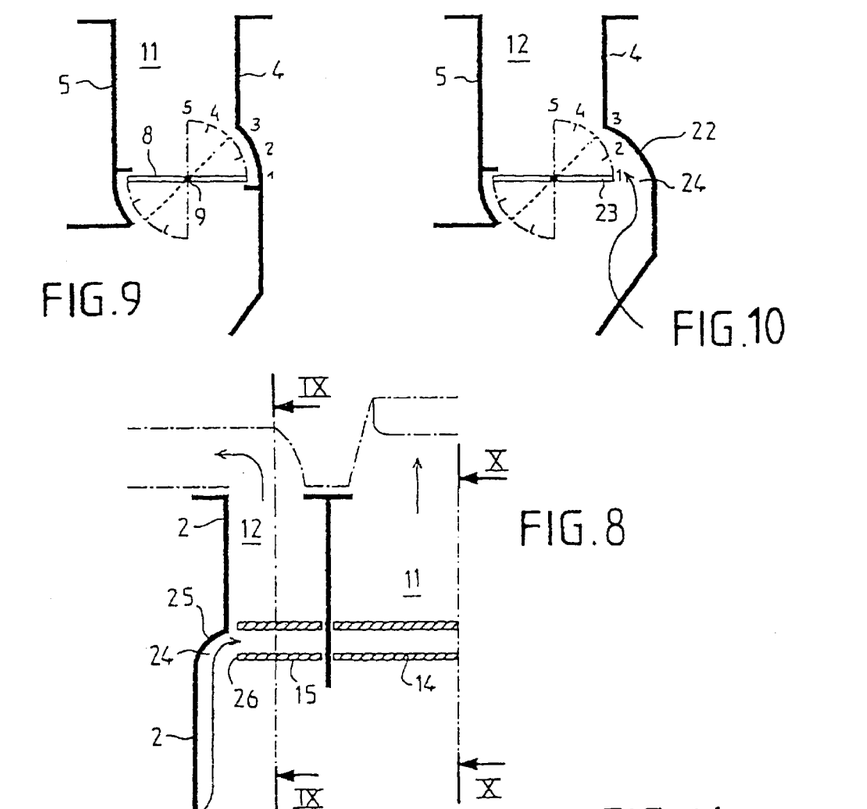
FIG. 8 is an axial section.
FIG. 9 is a section on the line IX—IX in FIG. 8.
FIG. 10 is a section on the line X—X in FIG. 8.
Figure 11:
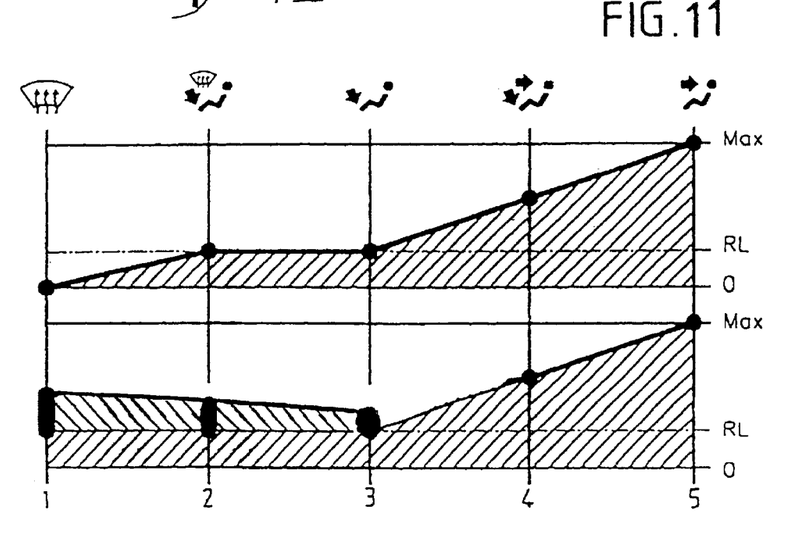
FIG. 11 shows the variation of the airflows in the central ventilating duct (top) and a lateral duct (bottom) as a function of the operating modes.

According to a first embodiment variant, which is shown in FIGS. 5 to 7, the flap 8 is a distribution flap which distributes the air between the ventilating ducts 11 and 12, the deicing duct 20 and the duct 21 for heating the feet. The flap 8 is of the butterfly type, and one of its wings constitutes the closing plates 14 and 15 of the ventilating ducts 11 and 12. The inlets of the lateral ducts 12 are delimited transversely by cylindrical walls 22, which are centered on the axis of rotation 9 of the flap 8 and are at a distance from the transverse edges 23 of the lateral closing plates 15. The gap 24 existing between the transverse edges 23 and the cylindrical walls 22 constitutes the passage through which an airflow larger than RL is delivered to the lateral ventilating outlets 6.

According to a second embodiment variant, which is shown in FIGS. 8 to 11, the ventilating flap 8 is of the butterfly type and controls only the airflows in the ventilating ducts 11 and 12. Here again, the inlets of the lateral ducts 12 are delimited transversely by cylindrical walls 22, which are centered on the axis of rotation 9 of the flap 8 and are at a distance from the transverse edges 23 of the lateral closing plates 15. Further, the lateral walls 2 and 3 have bulges 25 in front of the inlets of the lateral ducts 12. The lateral walls 2 and 3 are hence at a distance from the outer lateral edges 26 of the lateral closing plates 15. The gap 24 hence extends along the edges 23 and 26 of each lateral closing plate 15.

Figures 12, 13, 15:
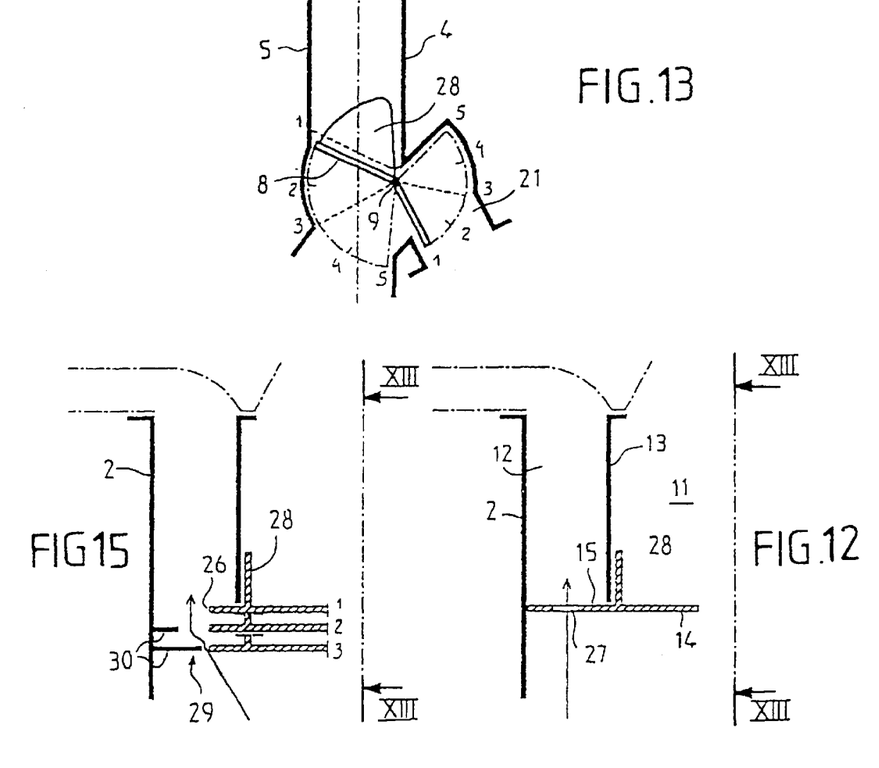
FIG. 12 is an axial section of the device according to this third variant.
FIG. 13 is a cross section.
FIG. 15 is similar to FIG. 12 and relates to another variant according to the second embodiment.
Figure 14:
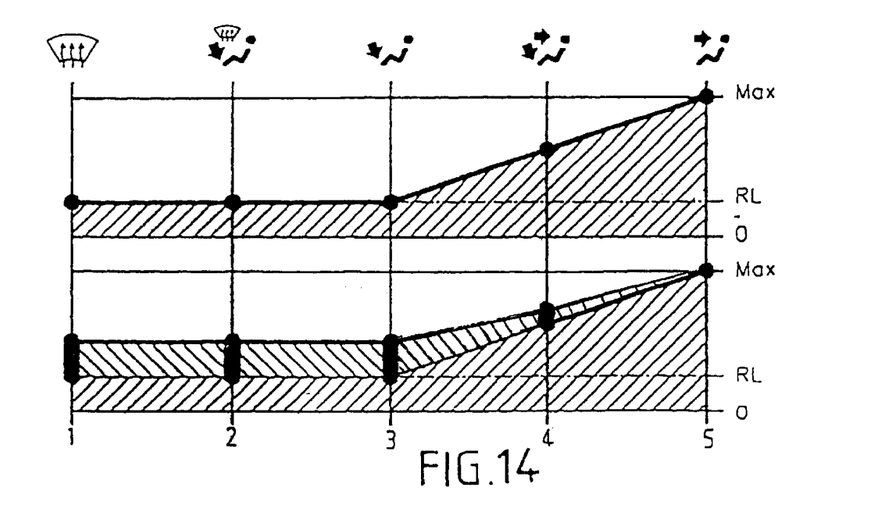
FIG. 14 shows the variation of the airflows in the central duct (top) and a lateral duct (bottom) as a function of the embodiments [sic]

According to a third variant of the second embodiment, which is shown in FIGS. 12 to 14, the lateral plates 15 of the flap 8 have a hole 27 which makes it possible to deliver additional air to the lateral ventilating outlets 6 in the operating modes which correspond to the positions of the flap 8 numbered 1 to 5. In this embodiment variant, the flap 8 is a distribution flap of the butterfly type, one of whose wings constitutes the closing plates 14 and 15 of the ventilating ducts 11 and 12, and the other of whose wings controls the airflow to the duct 21 for heating the feet. The closing plates 14 and 15 are joined to one another, and a sector 28 perpendicular to the axis of rotation 9 is formed between the plates 14 and 15 in order to make a seal between the ducts 11 and 12 in the operating modes not involving ventilation. This sector 28 is arranged immediately next to the separating wall 13 in the deicing operating mode.

FIG. 15 shows another embodiment variant of the ventilating flap 8 shown in FIGS. 12 to 14. Here, the holes 27 are replaced by a lateral passage 29 in the inlet of the duct 12. The lateral edge 26 of the lateral closing plates 15 is at a distance from the lateral wall 2 or 3, and ribs 30 are provided which form chicanes on the walls 2 and 3 in the passage 29.

According to a third embodiment of the invention, which is shown in FIGS. 16 to 32, each lateral duct 12 is separated, by a separating partition 40 perpendicular to the axis of rotation 9 of the ventilating flap 8, and arranged between the separating partition 13 and the corresponding lateral partition 2 or 3, into an inner lateral passage 41 delimited by the partitions 13 and 40, and an outer lateral passage 42 delimited by the lateral partition 2 or 3 and the separating partition 40. The ventilating flap 8 has a closing plate 14 at the inlet of the central ventilating duct 11, and a closing plate 15 at the inlet of the inner lateral duct 41, and further has means for controlling the airflow in the outer lateral passage 42. The plates 14 and 15 are in the same plane.

According to a first embodiment variant, which is shown in FIGS. 16 to 20, the ventilating flap 8 is of the butterfly type and has, in the inlet of the outer lateral ducts 42, closing walls 43 lying in a plane that passes through the axis of rotation 9 and is perpendicular to the plane of the closing plates 14 and 15. The outer lateral passages 42 hence place the chamber 10 in communication with the lateral ventilating outlets 7. In the operating modes of ventilating and ventilating/heating the feet, the outer lateral passages 42 are partly closed off by the closing walls 43.

Figures 16, 20:
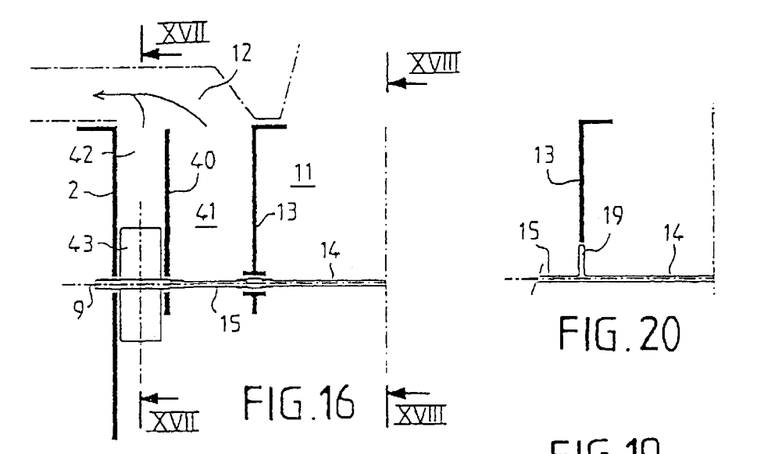
FIG. 16 is an axial section of this variant.
FIG. 20 shows another embodiment variant.
Figure 17:
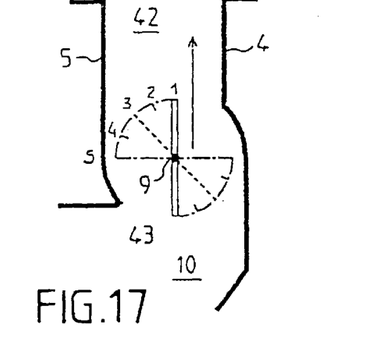
FIG. 17 is a section on the line XVII—XVII in FIG. 16.
Figure 18:
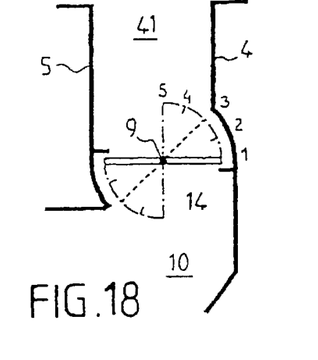
FIG. 18 is a section on the line XVIII—XVIII in FIG. 16.
Figure 19:
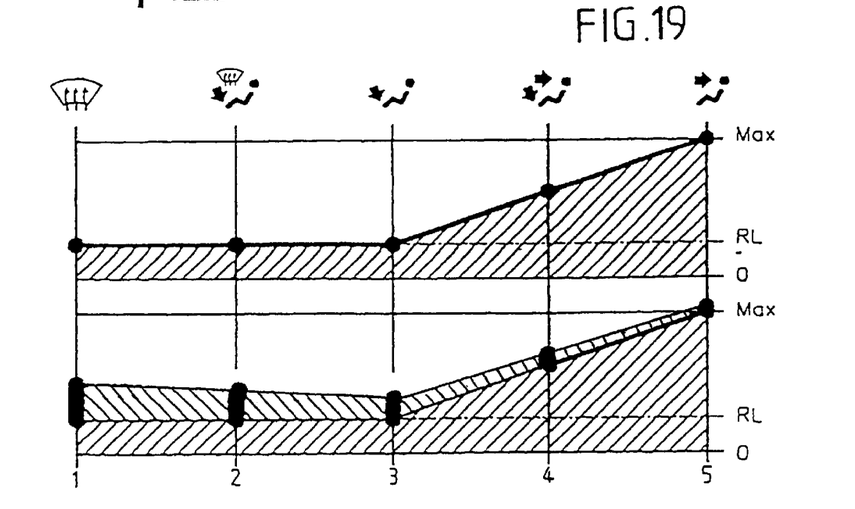
FIG. 19 shows the variation of the airflows in the central duct (top) and a lateral duct (bottom) as a function of the operating modes.
Figure 21:
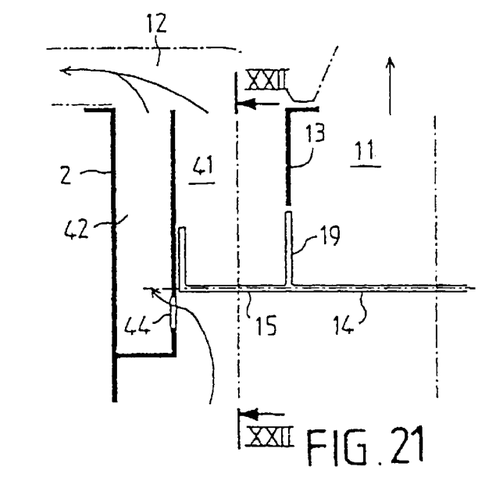
FIG. 21 is an axial section of this second variant.
Figure 22:
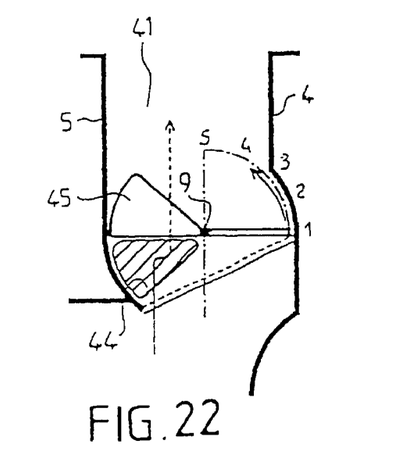
FIG. 22 is a cross section.
Figure 23:
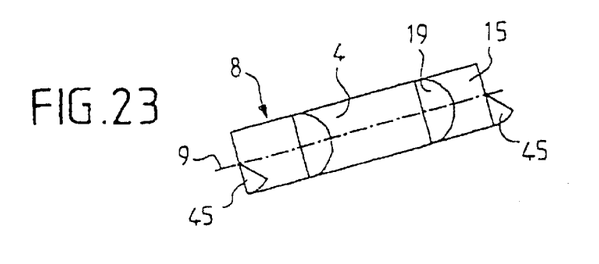
FIG. 23 is a perspective view of the ventilating flap in FIGS. 21 and 22.
Figure 24:
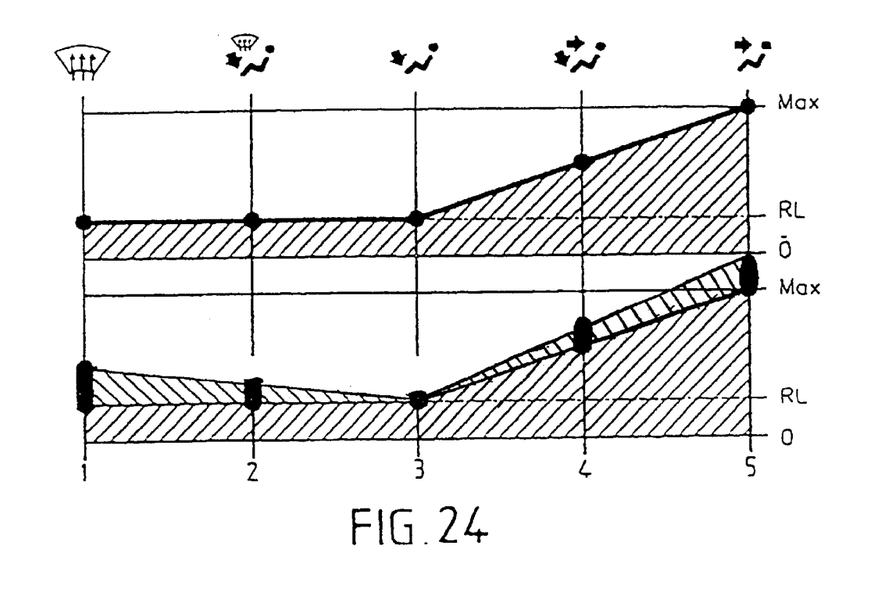
FIG. 24 shows the flow variations in the central duct and a lateral duct as a function of the operating modes.
Figure 25:
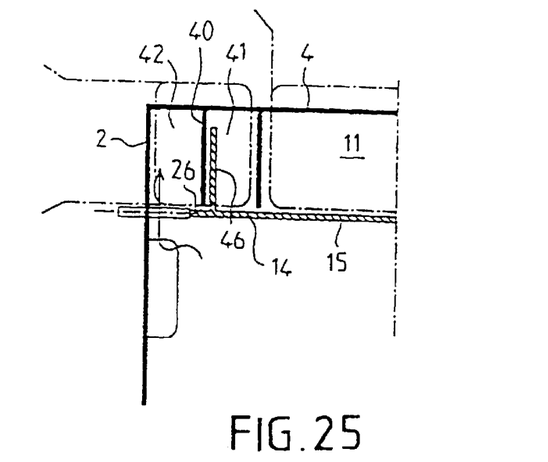
FIG. 25 is an axial section.
Figure 26:
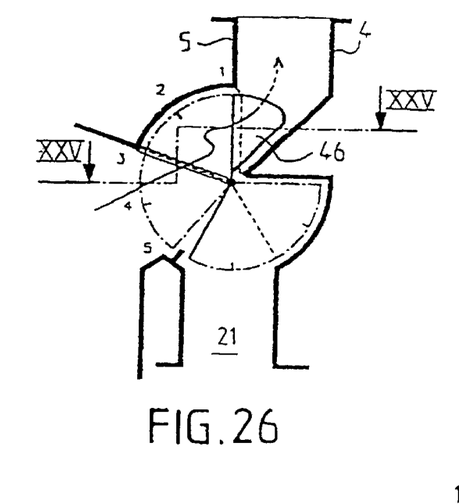
FIG. 26 is a cross section.
Figure 27:
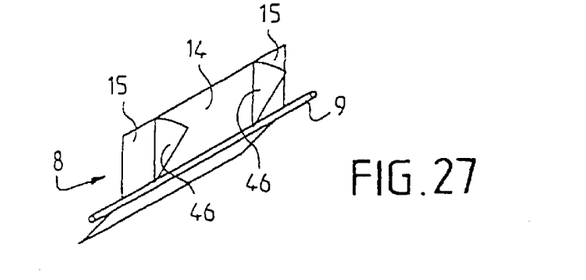
FIG. 27 shows in perspective the flap of the device in FIGS. 25 and 26.
Figure 28:
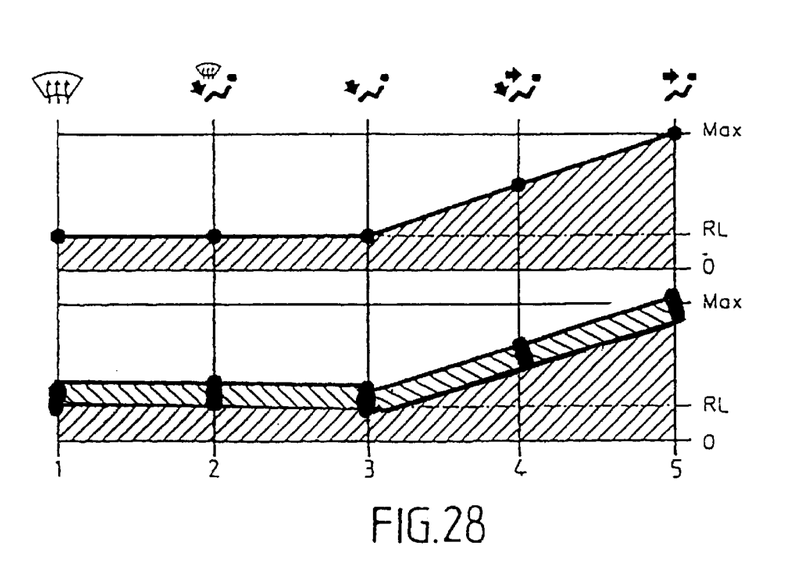
FIG. 28 shows the variations of the airflows in the central duct (top) and a lateral duct (bottom) as a function of the operating modes.
Figure 29:
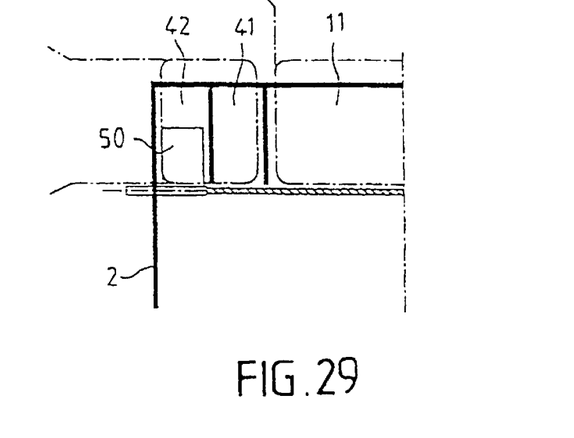
FIG. 29 shows this variant in an axial section.
Figure 30:
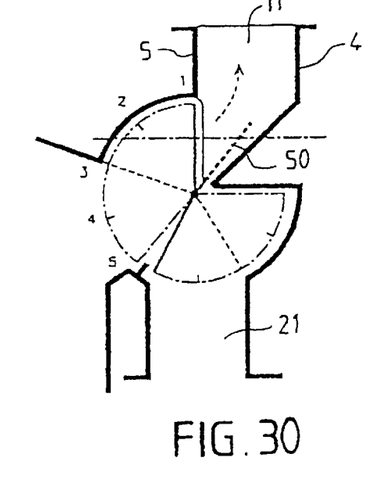
FIG. 30 shows it in a cross section.
Figure 31:
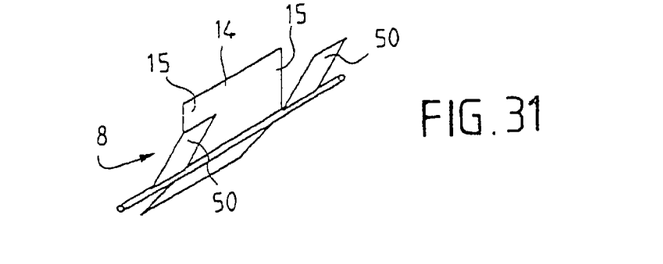
FIG. 31 shows in perspective the ventilating flap of the device according to this variant.
Figure 32:
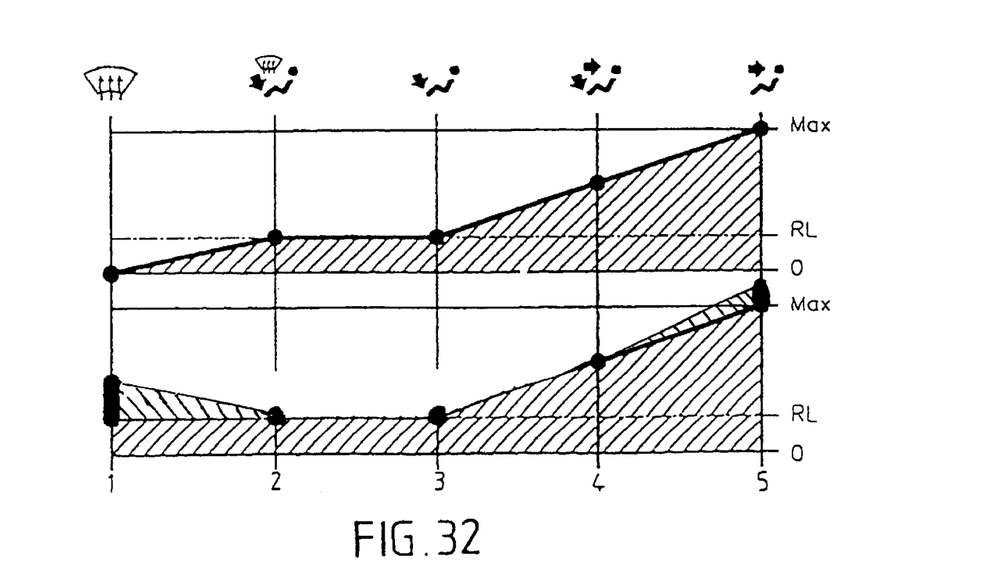
FIG. 32 shows the variation of the airflows in the central duct and a lateral duct.

In the example shown in FIG. 16, the closing plates 14 and 15 are separated by a gap, and the spindle of the flap crosses the separating partition 13. FIG. 20 shows a flap whose closing plates 14 and 15 are joined together by a half-disk 19 which also makes a seal with the separating partition 13.

According to a second embodiment variant, which is shown in FIGS. 21 to 24, the outer lateral duct 42 opens into the chamber 10 through holes 44 made in the separating partitions 40. The ventilating flap 8 is of the butterfly type and has a middle closing plate 14 and lateral closing plates 15. The plates 14 and 15 are separated by half-disks 19 which make a seal between the central duct 11 and the inner lateral passages 41. Flanges 45, perpendicular to the axis of rotation 9, extend from the lateral edges 26 of the lateral plates 14. In operating modes 2, 3 and 4, the flanges close off at least some of the holes 44. In the other operating modes not involving ventilation, the holes 44 are freed and the chamber 10 is in communication with the lateral ventilating holes 7.

According to a third embodiment variant, which is shown in FIGS. 25 to 28, the ventilating flap 8 is a distribution flap, one of whose wings includes the closing plates 14 and 15, and the other of whose wings controls the airflow in the duct 21 for heating the feet. The lateral closing plates 15 here extend partly in the inlet of the outer lateral passages 42, but their lateral edges 26 are at a distance from the outer walls 2 and 3, in order to make it possible to deliver an additional airflow to the lateral ventilating holes 7, via the outer lateral passages 42 in the operating modes of deicing, deicing/ventilating the feet, feet, ventilating/feet and ventilating.

A seal is made between the passages 41 and 42 by sectors 46 that are formed on the lateral plates 15 and interact with the separating partitions 40.

According to a fourth variant of the third embodiment, which is shown in FIGS. 29 to 32, the flap 8 is a distribution flap of the butterfly type, one of whose wings includes the closing plates 14 and 15 of the central duct 11 and of the inner lateral passages 41, and the other of whose wings controls the airflow in the duct 21 for heating the feet. The flap 8 further has, in the inlets of the outer lateral passages 42, closing walls 50 in the form of fins, which make an acute angle with the plane of the closing plates 14 and 15. In the operating modes of deicing and ventilating, the closing walls 50 are positioned in the outer lateral passages 42 so as to place the chamber 10 in communication with the lateral ventilating outlets 7.

FIGS. 4, 7, 11, 14, 19, 24, 28 and 32 show, in the form of graphs, the variation curves of the airflows in the central ventilating duct 11 and in a lateral ventilating duct 12, as a function of the operating modes of the heating, ventilating and/or air conditioning assembly. On these graphs, the abscissa represents the positions numbered 1 to 5 of the ventilating flap 8, and the ordinate represents the airflows. The upper curve in these graphs shows the variation of the airflow in the central ventilating duct 11. In the positions for deicing (No 1), deicing/heating the feet (No 2) and heating the feet (No 3), only a leakage flow RL passes through the central ventilating duct 11. From position 3 to position 5, the flow rate in the central ventilating duct 11 increases uniformly to a maximum value.

The lower curve in these graphs shows the variation of the flow rate in any one of the lateral ventilating ducts 12. In the positions numbered 1 to 5 of the ventilating flap 8, the flow rate in a lateral duct 12 varies as a function of the selected operating mode, which contributes to the comfort of the front passengers of the vehicle.

Starting from the position numbered 3 of the ventilating flap 8, that is to say in the operating modes of ventilating/ heating the feet and ventilating, the airflow in each of the lateral ventilating ducts 12 increases continuously to a maximum value.

What is claimed is:

1. A device for the distribution of ventilating air in the passenger compartment of a motor vehicle, having, downstream of a ventilating flap mounted in rotation about a transverse axis in a distribution compartment of a heating, ventilation and/or air conditioning assembly, a central ventilating duct and at least one lateral duct which are separated from the central duct by at least one partition perpendicular to the axis of rotation of said ventilating flap and are intended to deliver air to at least one lateral ventilating outlet, said ventilating flap being capable of assuming several angular positions as a function of the operating modes of said assembly, in particular an open position in the operating modes of ventilating and ventilating/heating the feet, in which modes an airflow supplies said ducts, and closed positions in the operating modes of heating the feet, deicing/heating the feet and deicing, in which modes said ventilating flap closes off the inlets of said ducts and said ducts are supplied only with air leaks, which device further includes means for supplying the lateral duct or ducts with an additional airflow which varies as a function of the selected operating mode.

2. The device of claim 1, wherein said means consist of at least one lateral vent permanently connecting the lateral duct or ducts to the chamber located upstream of said ventilating flap.

3. The device of claim 1, wherein said ventilating flap has, in the same plane, a middle closing plate in the inlet of the central duct and at least one lateral closing plate in the inlet or inlets of the lateral duct or ducts, and wherein said lateral plate or plates have a smaller area than the cross sections of the inlet of the lateral duct or ducts in planes passing through the axis of rotation of said ventilating flap.

4. The device of claim 3, wherein the or each inlet of the lateral duct or ducts is delimited transversely by one or more cylindrical walls centered on the axis of rotation of said ventilating flap and disposed at a distance from the transverse edges of the lateral closing plate or plates.

5. The device of claim 3, wherein the distribution compartment has lateral bulges in front of one or more of the inlets of the lateral duct or ducts.

6. The device of claim 3, wherein the or each lateral closing plate has holes through it.

7. The device of claim 3, wherein at least one outer edge of the or each lateral closing plate is at a distance from the corresponding wall of the distribution compartment, and the latter is equipped with ribs forming chicanes.

8. The device of claim 1, wherein each lateral duct is separated by a separating partition perpendicular to the axis of rotation of the ventilating flap into an inner lateral passage and an outer lateral passage, and the ventilating flap has, in the same plane, a middle closing plate in the inlet of the central duct and at least one lateral closing plate in one or more of the inlets of the inner lateral passage or passages, the outer lateral passage or passages being intended to deliver ventilating air to the lateral ventilating outlet or outlets, at least in the operating modes of heating the feet, deicing/ heating the feet and deicing.

9. The device of claim 8, wherein the ventilating flap further has means for closing off the inlet or inlets of outer lateral passages in the operating modes of ventilating and ventilating/heating the feet.

10. The device of claim 9, wherein the ventilating flap has, in one or more of the inlets of the outer lateral passage or passages, at least one closing wall which is/are substantially perpendicular to the plane of the closing plates.

11. The device of claim 9, wherein the inlet of the outer lateral passage or passages is formed by holes made in the separating partitions, and the ventilating flap has at least one flange which is/are capable of closing off said holes.

12. The device of claim 9, wherein the ventilating flap has, in one or more of the inlets of the outer lateral passage or passages, at least one closing wall making an acute angle with the plane of the closing plates.

13. The device of claim 1, wherein the ventilating flap is a flap of the butterfly type whose axis of rotation is at the center of the inlet of the ducts.

14. The device of claim 1, wherein the ventilating flap is formed by one wing of a distribution flap of the butterfly type, the other wing of which controls the airflow for heating the feet.

* * * * *

UNITED STATES PATENT AND TRADEMARK OFFICE
CERTIFICATE OF CORRECTION

PATENT NO. : 6,296,563 B1  Page 1 of 1
DATED : October 2, 2001
INVENTOR(S) : Philippe Vincent It is certified that error appears in the above-identified patent and that said Letters Patent is hereby corrected as shown below:

Title page,
Item [30], Foreign Application Priority Data, please change "Jan. 29, 1998 (FR) .........9801024" to -- Jan. 29, 1999 (FR) ............99 01024 --.

Signed and Sealed this

Fifth Day of March, 2002

*Attest:*

*Attesting Officer*

JAMES E. ROGAN
*Director of the United States Patent and Trademark Office*